US006953926B2

United States Patent
Reime (10) Patent No.: US 6,953,926 B2
(45) Date of Patent: Oct. 11, 2005

(54) METHOD AND DEVICES FOR OPTO-ELECTRONICALLY DETERMINING THE POSITION OF AN OBJECT

(76) Inventor: Gerd Reime, Friedenstrasse 88, D-75328 Schömberg (DE)

( * ) Notice: Subject to any disclaimer, the term of this patent is extended or adjusted under 35 U.S.C. 154(b) by 170 days.

(21) Appl. No.: 10/276,582

(22) PCT Filed: Jan. 16, 2001

(86) PCT No.: PCT/EP01/05545

§ 371 (c)(1),
(2), (4) Date: Nov. 18, 2002

(87) PCT Pub. No.: WO01/90770

PCT Pub. Date: Nov. 29, 2001

(65) Prior Publication Data

US 2003/0155487 A1 Aug. 21, 2003

(30) Foreign Application Priority Data

May 19, 2000 (DE) .......................... 100 24 156

(51) Int. Cl.⁷ .................. G06M 7/00; H01J 40/14; G09G 5/00
(52) U.S. Cl. .............. 250/221; 250/222.1; 345/173
(58) Field of Search .................. 250/221, 222.1; 345/173, 175, 702

(56) References Cited

U.S. PATENT DOCUMENTS

| 5,103,085 A | | 4/1992 | Zimmerman | |
| 5,225,689 A | * | 7/1993 | Buckle et al. | ........... 250/559.4 |
| 5,539,199 A | * | 7/1996 | Ruckh et al. | ........... 250/222.1 |
| 5,666,037 A | | 9/1997 | Reime | |

FOREIGN PATENT DOCUMENTS

| DE | 35 26 992 | 2/1987 |
| DE | 43 32 022 | 3/1995 |
| DE | 198 05 959 | 8/1999 |
| DE | 100 01 955 | 7/2001 |
| EP | 0 706 648 | 4/1996 |
| EP | 0 809 120 | 11/1997 |
| WO | 95/01561 | 1/1995 |

* cited by examiner

*Primary Examiner*—David Porta
*Assistant Examiner*—Suezu Ellis
(74) *Attorney, Agent, or Firm*—Cantor Colburn LLP (57) ABSTRACT

The invention relates to a method and a device for opto-electronically determining the position of an object (50) using a measurement assembly, which is separated from the object (50) by a medium (31, 52) that is permeable to at least one type of specific radiation. The measurement assembly consists of at least one active sensor zone (S) in the medium comprising at least two measuring paths (x, y), which are maintained by at least two radiation sources (1, 3) that emit the specified radiation and by at least one radiation receiver (2) that is allocated to the radiation sources. Said receiver determines the reflection (53) returned by the object (50) to generate a detection signal which corresponds to the received radiation. A specified radiation is emitted using the radiation sources (1, 3) and the reflection (53) returned by the object (50) is detected, in order to allocate initial values $(U(t), U_R(d))$ to the individual measuring paths. The invention is characterised in that an evaluation unit (55) determines the position and/or displacement of the object (50) by determining a specified angular curve of the object in relation to the radiation sources (1, 3, 57) from the initial value $(U_R(T), U_R(d))$, for a known spatial relationship between the radiation sources. This allows the position and/or displacement of an object to be opto-electronically detected in a simple and practical manner.

17 Claims, 8 Drawing Sheets

METHOD AND DEVICES FOR OPTO-ELECTRONICALLY DETERMINING THE POSITION OF AN OBJECT

REFERENCE TO RELATED APPLICATIONS

The present application claims the priority of German Patent Application 100 24 156.5, submitted on May 19, 2000, the disclosure contents of which are hereby expressly also made the object of the present Application.

1. Field of the Invention

The invention relates to a method for opto-electronically determining the position of an object in accordance with the main preamble of claim 1 as well as an apparatus for carrying out the method in accordance with the main preamble of claim 3.

2. State of the Prior Art

A method of this type and an apparatus of this type are known in EP 0 706 648 B1. The apparatus there is preferably used for the detection of water droplets on a pane of glass, it being possible to control a windscreen wiper in dependence on the droplets determined. Two measuring paths are set up for this purpose between one radiation source and one radiation receiver. Whilst the radiation source emits the radiation, the radiation receiver determines the reflection reflected on surfaces or objects. The two measuring paths are operated via a pulse generator in a periodic manner and an alternate manner. The detection signals determined by the radiation receiver are filtered and are then broken down again in a synchronous demodulator, which is controlled by the pulse generator, into the detection signals assigned to the individual measuring paths. A useful signal is determined in a comparator from this, which useful signal is used as a measurement for the wetting effected. If an even reflection occurs on the two measuring paths, the useful signal U(t) produced is zero. The useful signal is supplied to a signal centering level. Depending on whether there is a control voltage at the output of this signal centering level or not, the amount of radiation emitted into the measuring paths is then regulated with this control voltage in such a manner that the detection signal is re-regulated in dependence on a time constant. It is consequently possible to detect dynamic changes in the active sensor region of the measuring arrangement, reliable compensation for ambient light taking place at the same time.

Prior Patent Application 100 01 955.2 also made known evaluating the useful signal in such a manner that it could provide a displacement pattern, such as, for example, as it occurs with a switching movement. For example, a finger touching a control surface, braking there and then leaving the control surface within a certain time can be detected as a displacement pattern. The useful signal U(t) is also used for this purpose.

DE 43 32 022 C2 makes known a method for opto-electronically detecting the angular position of a measured object. The angle relates to the rotation about an axis, which stands vertically on the plane in which the optical axis of the receiver and the at least two light sources lie. Only one specific angular position can be measured with this arrangement, it also having a further prerequisite that the object assumes a certain arrangement relative to the optical axis of the receiver. Consequently, the displacement and/or position of the object cannot be freely determined.

DE 35 26 992 C2 and DE 198 05 959 A1 make known photosensor arrangements, which are equipped with, among other things, signal length discriminators. These discriminators, however, have relatively long delay times (10 seconds, or respectively 0.1 to 0.6 seconds), as though a type of outside light compensation is intended, the input signal cannot be liberated totally from the outside light. Consequently, a fairly long delay time has to be selected for certainty.

SUMMARY OF THE INVENTION

Proceeding from this state of the art, the object of the present invention is to make available a method and an apparatus, which can opto-electronically determine in a simple and economical manner the position and/or displacement of an object.

This object is achieved through a method with the characteristics of claim 1 as well as through an apparatus with the characteristics of claim 3.

To this end, optoelectronic measuring paths are provided into which a specific radiation is emitted, in this case the reflection also being detected by a radiation receiver. Compensation for ambient light can preferably be provided so that method and apparatus can also be operated in arbitrary ambient light conditions. Moreover, the initial values originating from the measuring paths should be detectable separately on their own and the spatial conditions between radiation sources and radiation receiver should be fixed. In this way it is possible to use the measured values of individual measuring paths to determine the position of an object and also to determine the displacement of an object, which is displaced in the active sensor region of the measurement arrangement. The spatially separated arrangement of the radiation sources consequently always produces for the object clear and specific conditions of reflection, which is reflected by the object from the two measuring paths, for determining the position and/or the displacement of the object. This condition is initially independent of how strongly the object reflects the radiation. In addition, always determined is the position of the object, which generates the strongest reflection, which therefore lies for the most part closest to the measuring arrangement.

In particular according to claims 5 and 6, a corresponding apparatus for determining a clear result can be improved even more by providing at least one additional source of radiation. Should this result in redundant equations, those solutions where the object should be located within the measuring arrangement or below or respectively behind the measuring arrangement, drop out.

SHORT DESCRIPTION OF THE FIGURES

The invention is described in more detail below by way of an exemplified embodiment with the enclosed FIGS. In which:

FIG. 2 is a second exemplified embodiment of the measuring arrangement, FIG. 3.1 is the pattern of the measuring signal when the first active sensor region is swept over, FIG. 3.2 is the pattern of the useful signal, if, for example, a cloth is moved rapidly backwards and forwards on the glass plate, FIG. 4$a$ is the pattern of the useful signal U(t) when the first active senor region is touched, FIG. 4$b$ is the pattern of the differentiated displacement signal $U_1(t)$ when the first active sensor region is touched, FIG. 4c is the pattern of the useful signal U(t) when a finger is removed from the first active sensor region, FIG. 4d is the pattern of the differentiated displacement signal $U_1(t)$ when a finger is removed from the first active sensor region, FIG. 4e is the pattern of the useful signal U(t) when the second active sensor region is touched, FIG. 4f is the pattern of the differentiated displacement signal $U_1(t)$ when the second active sensor region is touched, FIG. 4g is the pattern of the useful signal U(t) when a finger is removed from the second active sensor region, FIG. 4h is the pattern of the differentiated displacement signal $U_1(t)$ when a finger is removed from the second active sensor region.

DETAILED DESCRIPTION OF PREFERRED EXEMPLIFIED EMBODIMENTS

The invention is now explained in more detail with reference to the enclosed drawings. However, the exemplified embodiments are only examples and are not to restrict the inventive concept to a specific arrangement.

The exemplified embodiments show various developments of an opto-electronic apparatus for determining the position of an object 50 through the intermediary of a measuring arrangement, which is separated from the object 50 by a medium 31, 52, which is permeable to at least one specific radiation. The apparatus is equipped with at least two light emitting sources of radiation 1, 3, 57 and at least one radiation receiver 2. The radiation receiver 2 passes its signals, the value of which depends on the amount of light received, to an evaluation unit 55. Sources of radiation 1, 3, 57 and radiation receiver 2 can be disposed in such a manner that the light emitted by the transmitting member is dispersed or reflected by objects, which are situated within a certain active sensor region S, in such a manner that at least a portion of this dispersed or reflected light reaches the radiation receiver 2 as reflection 53. Consequently, the change in the amount of reflected or dispersed light received by the radiation receiver, which change is caused by a displacement of the object, causes the status of the initial values to change.

Figure 1:
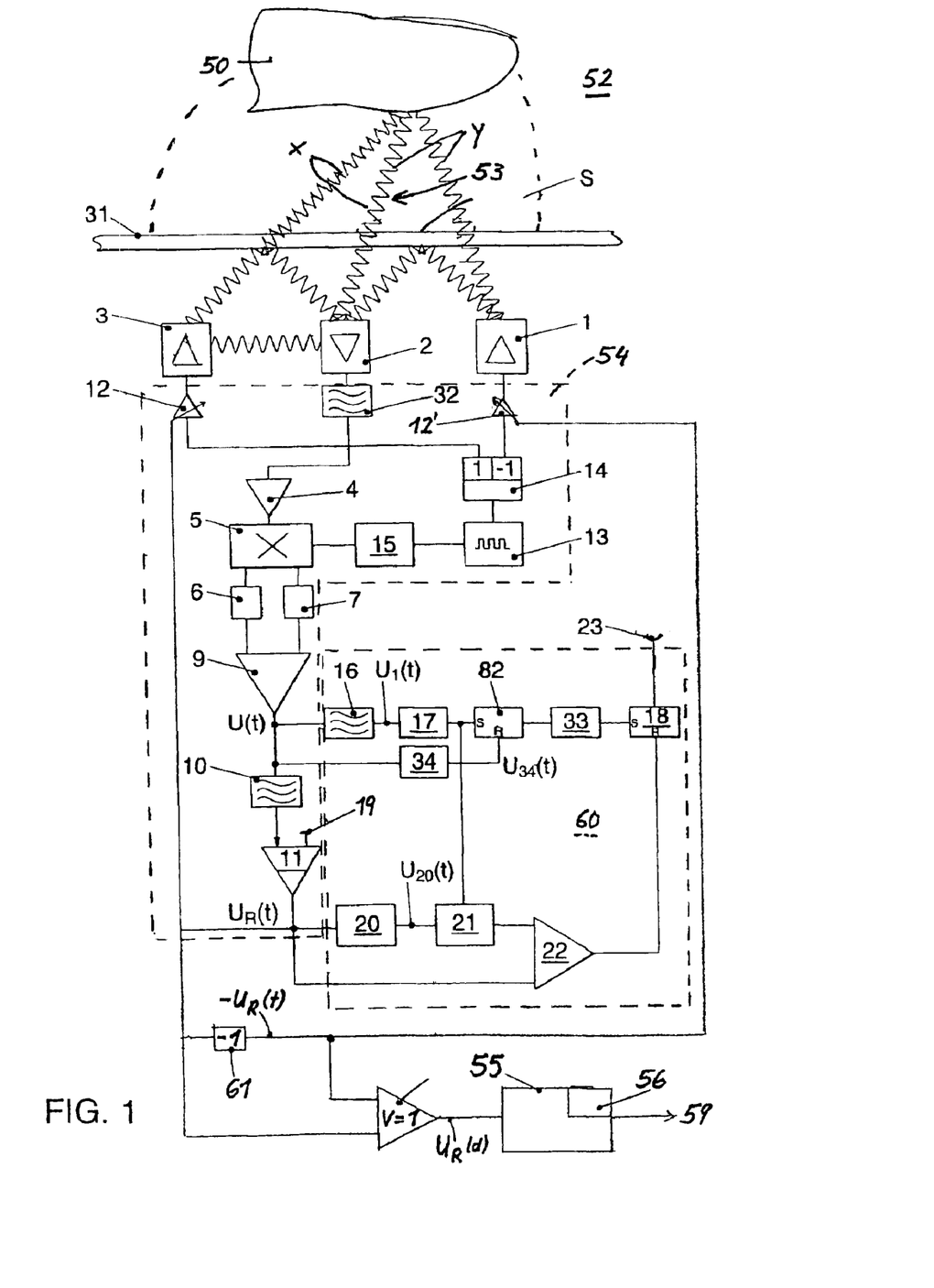
FIG. 1 is a first exemplified embodiment of an apparatus according to the invention.

FIG. 1 shows at least two light diodes 1, 3 disposed under a glass plate 31 as the source of radiation. The radiation from this source, light in this case, can be reflected at least partially on the glass plate 31 as transmitting element, also penetrates the glass plate and after reflection or respectively dispersion at the object 50 impacts partially on the photodiode 2 as radiation receiver. Consequently, the glass plate 31 and also the ambient air 52 are media, which are permeable to a specific radiation. In principle, only one medium is sufficient and this can be not only solid or gaseous but also a liquid. However, a plurality of media, which are permeable to the respective radiation, can also be provided.

In FIG. 1, the light of the light diodes 1, 3 is reflected at a finger as the object 50. A photodiode or a correspondingly wired light diode can act as the source of radiation 2. The glass plate or another surface should be permeable to light, or respectively radiation, at least within a certain band. The light of the light diode 1 is only partially reflected at the glass plate 31 and for the rest consequently exits into the outside air, it being reflected in its turn by an object 50, a finger in this case, and consequently can be dispersed back partially into the photodiode 2.

The two light diodes 1, 3 are supplied with voltage through the intermediary of a pulse generator 13, the signal of one of the two light diodes being inverted by inverter 14. Where the light output from the light diodes is equal and the reflection is exactly symmetrical, or respectively where the light strength of at least one of the two light diodes is suitably regulated (see below), there is a direct voltage signal at the output of the photodiode 2, which direct voltage signal is supplied to a high-pass filter 32 so as to eliminate direct voltage and low-frequency alternating parts. The high-pass filter 32, the cut-off frequency of which is below the frequency of the pulse generator 13, only allows through alternating parts such that, with the corresponding output performance of the light diodes 1, 3, the signal supplied to the amplifier 4 becomes "0". Influences from ambient light sources are excluded with this arrangement.

This signal, filtered in this way, is supplied after the amplifier 4 to a synchronous demodulator 5. The synchronous demodulator 5 receives its clock pulse from the frequency generator 13, it being possible to delay this clock pulse through the delay unit 15 in a corresponding manner for adaptation to the signal run times in the high-pass filter 32 and in the amplifier 4. The synchronous demodulator 5 divides the signal from the light sources 1 and 3, which is common to the signal path of the light receiver 2, of the high-pass filter 32 and of the amplifier 4, into two paths again, corresponding to the respective measuring paths x, y. The signal portions extracted by the synchronous demodulator 5 are cleaned of interfering spectral regions in the low-pass filters 6 and 7 and are supplied to the comparator 9. In the case represented, the comparator 9 comprises one single operation amplifier. The initial values corresponding to the light emitters and consequently, where there are two measuring paths, to the measuring paths x, y are at the outputs of the respective low-pass filters 6 and 7. In the tuned state this would be zero two times. These two signals are supplied to the comparator 9. The voltage value U(t), the useful signal, is at the output of this comparator. This useful signal can be used to determine purely the position in a one-dimensional manner, in this case with the measuring paths x, y.

For dynamic measurement, the useful signal U(t) can be supplied to the signal centering level 11 via another low-pass filter 10. The output of the signal centering level 11, where there is the voltage $U_R(t)$, is connected to the regulator 12, or respectively via the inverting level 61 to the regulator 12', which operates in an inverted manner. Alternatively, it is also possible for only one of the two sources of radiation to be regulated, however this is at the detriment of the elimination of temperature and ageing influences on the useful signal $U_R(d)$. The achievement with this arrangement is that the useful signal does change when there is a change in the reflection of the light beam emitted by the light diode 1, but it is always returned back to zero. The time constant for this resetting process is determined in the exemplified embodiment by the low-pass filter 10. With this, it is possible to determine the dynamic displacement of an object.

The arrangement described up to now is also known in WO 95/01561 or respectively EP 0 706 648 B1. It was put forward in these cases for detecting water droplets on the windscreen and in the case here forms substantially an apparatus 54 for the compensation of ambient light, which it is possible in principle to form in another manner.

Figure 7:
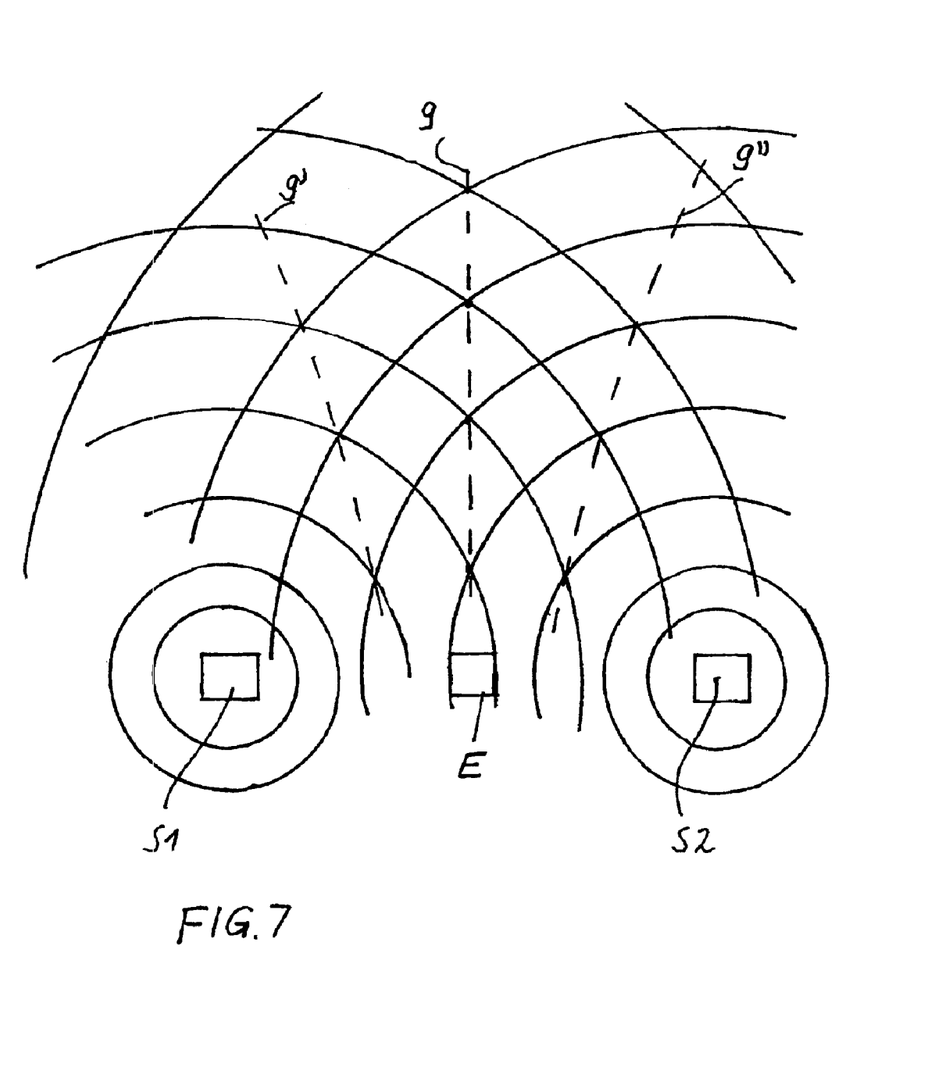
FIG. 7 shows lines of the same signal strength for two sources of radiation.

According to FIG. 7, concentric circles are produced emanating from the sources of radiation S1, S2 when looked at in a two-dimensional manner. If an object is situated on the straight line g, which—where there is a symmetrical arrangement of the sources of radiation relative to the radiation receiver E—goes substantially through the radiation receiver E, the same measured value $U_R(t)$ and $U_R(t')$ is produced on the two measuring paths and consequently an initial value $U_R(d)$ of zero. Within a certain range, this is independent of the distance between the object and the radiation receiver E and independent of the reflection characteristics of the object. However, if the object is moved, for example on the angular curve g' or g", the initial value remains the same along this line, it is differentiated however from the initial value along the line g into the one (g') or the other (g") direction. A fixed angular curve can be assigned to a certain initial value in this way.

The apparatus, consequently, forms a measuring arrangement, which can determine the position and/or displacement of the object 50. If the object is situated or is displaced in the active sensor region S, it generates a reflection 53, which is more or less strong. The degree of reflection does depend on the reflection characteristics of the object 50, but this does not influence the initial value $U_R(t)$, that-is-to-say the relationship between the two measuring paths or respectively their differential value $U_R(d)$. As, in addition, the measuring paths x, y are spatially determined at least with regard to their starting point (radiation source 1, 3) and end point (radiation receiver 2), the position of the object can be determined on the family of curves g', g, g" (FIG. 7) from the initial value $U_R(t)$, or respectively from the differential value $U_R(d)$.

On the basis of the dynamic detection, the displacement of the object relative to the sources of radiation 1,3 can also be detected through the intermediary of the circuit 60, which has still to be described. If the dynamic detection is not required, there is no need for the low-pass filter 10, the signal centering level 11 or the signal evaluation in the form of the circuit 60; as a consequence U(t) then becomes $U_R(t)$.

With the measuring arrangement represented in FIG. 1 for determining the position in a one-dimensional manner—leaving the dynamic evaluation out of it for the moment—, the useful signal $U_R(d)$ is zero when the object 50 is situated in front of the receiver such that the same reflection is reflected back from the two measuring paths. With the same distance between the sources of radiation 1, 3, this is a position on the straight line g in FIG. 7 through the radiation receiver 2. If, moreover, the sources of radiation 1, 3 and the radiation receiver are on a straight line, the straight line g is part of a plane, the normal line of which is that line and which at the same time is the plane of symmetry with regard to the sources of radiation 1, 3. If the object in FIG. 1 then moves from this straight line g further to the left or the right, the useful signal U(t) changes for a short time depending on the direction of displacement towards positive or negative values relative to the reference voltage 19.

A one-dimensional displacement can be detected with the two measuring paths x, y, for example in a horizontal arrangement for determining the position of bottles on a guide rail in a bottling plant. To detect another dimension, for example the location of the bottle on a flat belt, at least a third source of radiation 57 can be provided as in FIG. 2. In conjunction with another source of radiation 1 or 3, it forms a second one-dimensional measuring arrangement with the measuring path z. However, the second measuring arrangement could equally be set up to be totally self-sufficient from the first measuring arrangement and have two of its own sources of radiation and its own radiation receiver. The measuring paths can be operated in a time-sequential manner, or respectively in a synchronous manner, for example with different wavelengths. The two measuring arrangements each provide an angular curve (for example g, g', g"), at the intersection of which is located the object 50 where the projection is two-dimensional. The second measuring arrangement for detecting the spatial position of an object 50 can be disposed at almost any distance, which is >0, relative to the first measuring arrangement up to the limit of the measuring range. With two measuring arrangements, whether they are interlocked or not, it is possible to calculate the angles of the object at which the object stands relative to the straight lines through radiation sources and radiation receiver. At least one additional source of radiation or measuring arrangement must be provided for three-dimensional determining, however this could also be formed through corresponding circuitry by using the measuring path z and the others of the measuring paths y or x as shown in FIG. 2.

Figure 2:
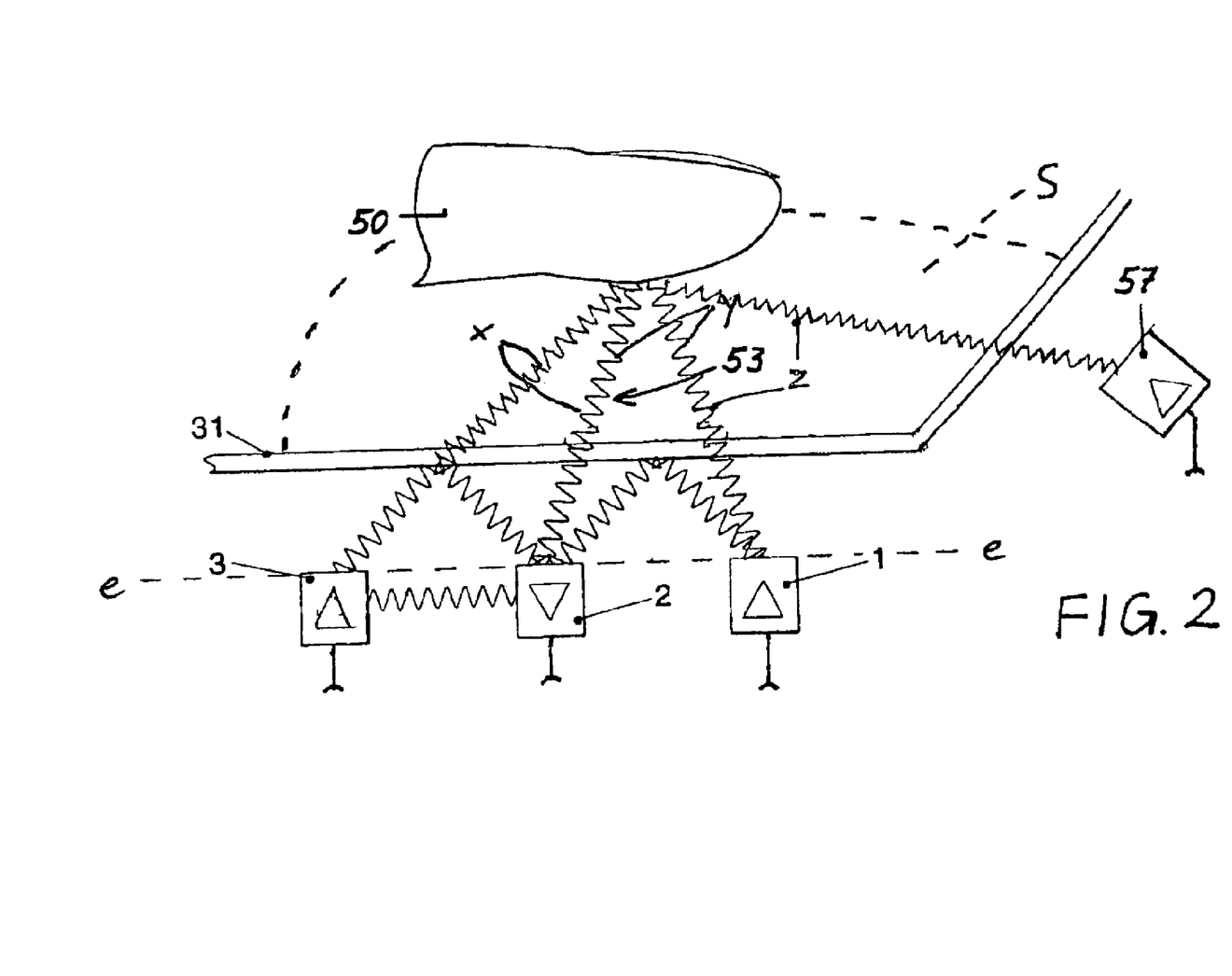

In the exemplified embodiment in FIG. 2, the third source of radiation 57 is disposed outside of the plane e—e, in which the first two sources of radiation 1, 3 and the radiation receiver 2 are disposed. However, this is not absolutely necessary. In principle, the third source of radiation or the other measuring arrangement can be at an arbitrary angle of between 0° and 360° relative to the first measuring arrangement, it is only an angle of 180° which possibly produces results which cannot be evaluated. If at least this third source of radiation 57 is disposed in such a manner that its main radiation part is not emitted normally relative to the plane e—e, in which the first two sources of radiation 1, 3 and the radiation receiver 2 are disposed, the measuring result can be clearly determined. In principle, even more sources of radiation and/or radiation receivers can be provided.

According to the method, the angular curve of the object is determined relative to at least two straight lines, which are each formed by radiation receiver and radiation source, as follows:

emitting the specific radiation through the intermediary of the sources of radiation 1, 3, 57, detecting the reflection 53 reflected by the object 50, determining the initial value and its evaluation, the evaluation unit 55 determining, from the initial values and consequently from the relationship between the determined values and/or their differential value, the position of the object by the evaluation unit determining a specific angular curve of the object relative to the sources of radiation 1, 3, 57 for a known spatial relationship between the sources of radiation.

Certain measured value relationships can also be deposited in a data bank 56 so as to convert non-linear angle correlations into position-corrected initial values.

Figure 4:
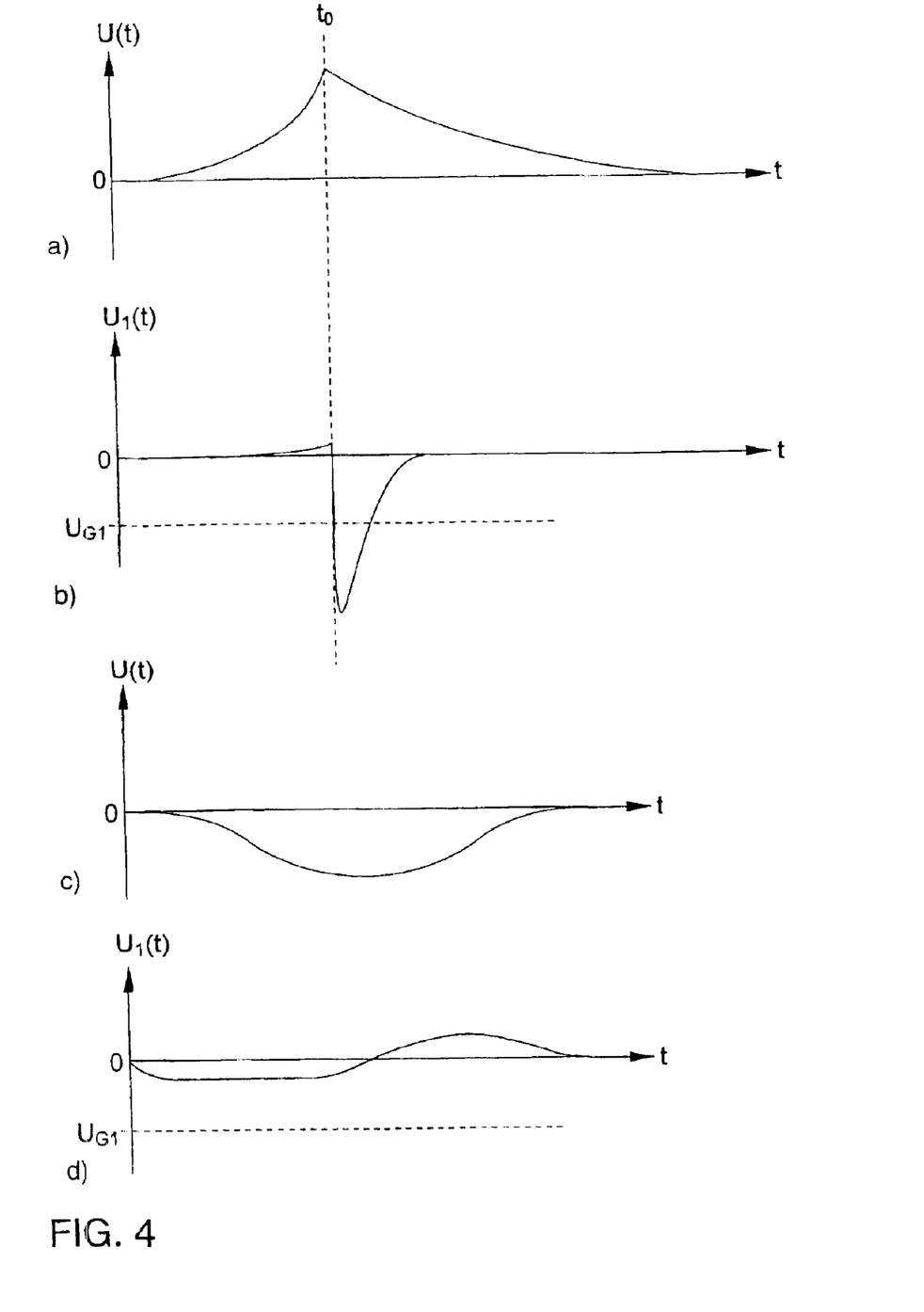
Figure 5:
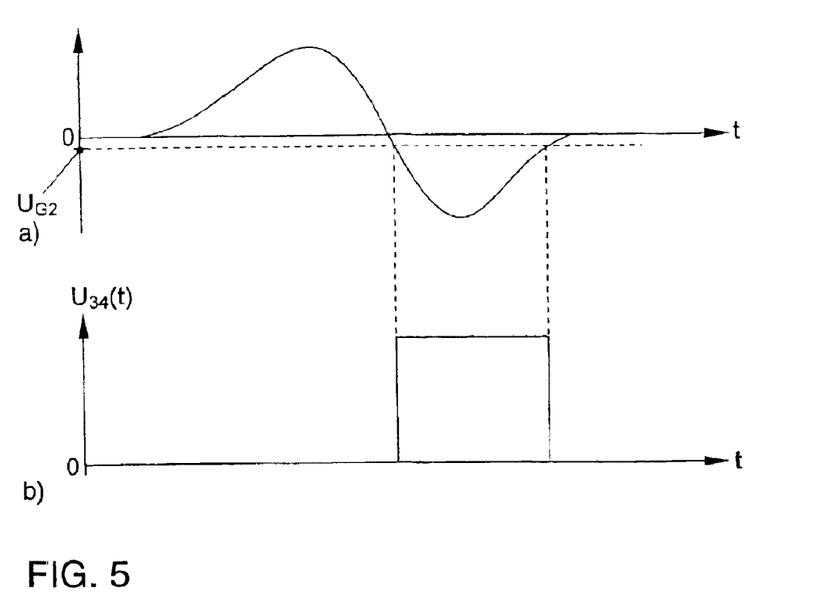
FIG. 5a is the pattern of the measuring signal when the first active sensor region is swept over.
FIG. 5b is the pattern of the output signal of the first threshold value switch in the situation represented in FIG. 5a, FIG. 6 is the pattern of the values $U_{20}(t)$, $U_R(t)$, as well as $U_R(t_0)$.

FIG. 1 also shows a further development, where the useful signal U(t) is used additionally, for example to recognize whether an object is approaching, for example, the glass surface 31 and consequently initially switches-on the measuring arrangement, or respectively, for example, activates a lighting device. The position or respectively the displacement is then detected and, as soon as the object 50, such as, for example, a finger, is removed from the glass surface, the apparatus is switched-off again. This object can be achieved with the below-described circuit 60, which is known, however not for this purpose, from former Patent Application 100 01 955.2. Other specific embodiments are also explained in the case referred to, however for the sake of simplicity in this case only one specific embodiment of this type is described for detecting a displacement pattern, which corresponds to a switching operation, a difference still being made between $U(t)$ and $U_R(t)$:

In FIGS. 3.1, 3.2 and 4, the useful signal $U(t)$ output by the above-described sensor device is represented in various situations. FIG. 4a shows the useful signal $U(t)$ when the active sensor region S is touched. A switching operation is to be triggered by this type of signal. FIGS. 3.1 or respectively 3.2 show useful signal patterns, such as occur when the active sensor region S is wiped over once or respectively when the active sensor region S is wiped over backwards and forwards. These types of signal patterns are not to trigger any switching operation. This goal is achieved as follows (FIG. 1):

The useful signal $U(t)$ is supplied to the high-pass filter 16, which operates in this case as a differentiator, such that the value $U_1(t)$ of the differentiated displacement signal is at its output. When the object 50, for example a finger, is displaced towards the active sensor region S on the glass plate 31, the value $U(t)$ of the useful signal slowly increases analogous to the displacement and stops abruptly when the finger is braked on the glass plate 31, see FIG. 4a. If the finger remains still, the value $U(t)$ of the useful signal is slowly regulated back to $U_0$. The abrupt change in the value of the useful signal results in a jump in the displacement signal value $U_1(t)$ at the output of the high-pass filter 16, see FIG. 4b. This is detected by the threshold value switch 17 when a predetermined value $U_{G1}$ is exceeded, in the example this is a negative value, and the output of the first threshold value switch 17, which is connected to the set input of the first flip flop 82, is set to on and consequently the first flip flop 82 is set. The cut-off frequency of the high-pass filter 16 is selected in such a manner that contact at moderate speed still results in an easily detectable signal. The cut-off frequency could, for example, be in the region of 10 Hertz.

In this case a signal generated from the useful signal is used, that-is-to-say the displacement signal which is obtained through differentiation, which signal triggers a first process when its value $U_1(t)$ exceeds a certain limit value $U_{G1}$. However, circuit arrangements and cases of application are also conceivable, where the useful signal is used directly and triggers a process—change in status of the flip flop—when the value $U(t)$ of the useful signal exceeds a specific value or falls below a specific value.

Each displacement which is quick enough and sweeps over the active sensor region S, triggers this process, i.e. the output of the first flip flop 82 is initially set to active. However, a sweep-over or a similar movement which is not meant to be detected as a deliberate switching operation is also sufficient to effect this (see FIGS. 3.1 and 3.2). Consequently, the useful signal is supplied to a second threshold value switch 34, which becomes active when the value $U(t)$ of the useful signal falls below a certain second threshold value $U_{G2}$. The fact being made use of in this case is that the removal of an object (removal of a finger) results in a lowering of $U(t)$ in the opposite direction in relation to the approximation, in the example into the negative region (FIG. 3.1). Where the second threshold value $U_{G2}$ of the second threshold value switch 34 is exceeded, its output $U_{34}(t)$ is set to active (see FIG. 5).

The output of the threshold value switch 34 is connected to the reset input of the flip flop 82 in such a manner that when there is a sweeping over or similar, which has set the flip flop 82 to active, this latter is reset back to zero a short time later. The output signal of the flip flop 82 is supplied to the time detection circuit 33. This circuit is set up in such a manner that its output is only set to active if the flip flop 82 was active for longer than a predetermined time $\Delta t_1$, for example 100 ms. This predetermined first time slot $\Delta t_1$ corresponds approximately to the conventional minimum dwell time of a finger, a hand or another part of the body when touching a switch, which is configured as an electric switching member.

The output of the time detection circuit 33 is connected to the set input of the second flip flop 18. When the active sensor surface is deliberately touched, the output of the second flip flop 18 is consequently set to active, as in this case the time between setting the first flip flop 82 and resetting this flip flop is greater than $\Delta t_1$, in other words: The finger remains for longer than $\Delta t_1$ on the active sensor surface S. However, where there are movements which are not meant to trigger a switching operation—for example wiping over with a cloth—, the time between setting and resetting the first flip flop 82 is less than $\Delta t_1$, such that this movement consequently does not result in the setting of the second flip flop 18. By touching the active sensor surface, the status of the second flip flop 18 is changed in a controlled manner. The output of the flip flop 18 can also be connected to a switching output 23, for example a relay, which, for example, is used in conjunction with the value at the output 59 for controlling or operating a device.

The following displacement pattern, therefore, is detected by the circuit 60: Approximation of an object—abrupt braking of the object—persisting of the object for a time slot which exceeds a predetermined time slot. If this displacement pattern is detected, the switching status of a switching member, in this case the second flip flop 18, is changed. Subsequently then, the displacement of the object can be detected with the aforementioned circuit on the basis of the initial values $U(t)$, $U_R(t)$ so as to achieve an adjustment of a device—for example adjusting the temperature of a hot plate.

A removal of the finger is not detected by the threshold value switch 17 as the change in the value ($U(t)$ of the useful signal is effected in the other direction and is too small after the differentiation (FIG. 4c) and, consequently, the value $U_1(t)$ of the displacement signal obtained through differentiation does not exceed the first limit value $U_{G1}$.

Figure 6:
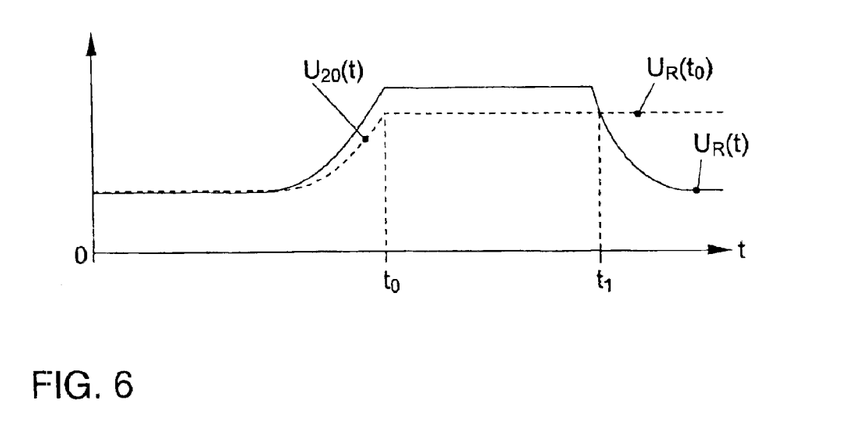

In many cases of application it is desirable that the second flip flop 18, which is set through the touching of the active sensor surface S, is reset again through targeted removal of the finger. This then produces the function of a key. However, it is advantageous if the canceling of the flip flop 18 is not achieved until the finger has been removed a few millimeters away from the glass plate so as to avoid any inadvertent canceling of the flip flop through a minimal movement. In the exemplified embodiment represented in this case, this problem is solved as follows:

The instantaneous value of the control signal $U_R(t)$ present at the output of the signal centering level 11 is scanned and stored at a moment at which the approximating object is still situated just in front of the operation interface. To achieve this in the exemplified embodiment, this signal is supplied to the delay circuit 20. The voltage value $U_{20}$, which is present at the output of the delay circuit 20, is stored in the memory 21 at the moment $t_0$, at which a signal is present at the output of the first threshold value switch 17, that-is-to-say at the moment at which the first threshold value switch 17 has detected the moment of the touching. Alternatively, the signal present at the output of the signal centering level 11 can also be multiplied by a value less than 1 and this value then stored. In the two cases there is consequently a dependency on $U_R(t)$ such that the value $U_R(t_0)$, stored in this way, is neither dependent on the ageing-dependent status, for example, of the glass plate, on the temperature or on other circumstances. The value $U_R(t_0)$, stored in this way, is supplied to a first input of the comparator 22. The control signal with the value $U_R(t)$ is at the second input of the comparator. As long as the value of the control signal is above the initial value of the memory 21, the comparator circuit 22 does not supply an output signal. However, if the value of the control signal at the moment $t_1$ sinks below the stored value, the output of the comparator is set to active. The signals $U_{20}$, $U_R(t)$ and $U_R(t_0)$ are represented in FIG. 6. The second flip flop 18 is reset with this signal.

It is also conceivable not to fix all the threshold values, time constants etc. of the components used in an invariable manner, but at least partially to use components where the corresponding values can be changed from outside through the intermediary of a control input. Consequently, the displacement pattern to be detected could be predetermined, where necessary, as an example, by the software of an overall system, in which the switch in incorporated.

As such, the circuit 60 has the following advantages:

The measured values U(t) and consequently the initial value 23 and the measured value $U_R(d)$ can be obtained through a glass plate—obviously a plate made from another material can also be used in this case, it just has to be permeable to the selected spectral range—, when the transmitting and receiving members are situated behind the glass plate. The displacement or respectively the approximation or touching of an object, for example, a finger on the side of the plate located opposite the transmitting members is then detected.

The position—relative to the light diodes acting as radiation sources and the photodiode acting as radiation receiver—and the form of the plate, which is permeable to radiation, can be freely selected within a wide range.

Scratches/dirt on the glass plate do not impair the detecting of the measured value 60 as the resultant static changes in the reflection behavior are compensated for by the system.

Obviously the measured values U(t) and consequently the initial value 23 and the measured value $U_R(d)$ can also be obtained without an insulating glass plate, even, for example, when the sources of radiation are emitted almost parallel to a plate or surface. In this case too, the approximation or respectively the touching of this surface is detected through the intermediary of the evaluation unit 60 and the local position of the object, for example the finger, is represented by the measured value $U_R(d)$.

The arrangement is "blind" to ambient light such that the arrangement can be operated under external light conditions which change a great deal.

The following method of operation can also be realized in addition:

The distance between the object 50 and the measuring arrangement is determined initially by the evaluation unit 55 and/or the circuit 60. If a predetermined distance is fallen below, a light of a switch or a display, for example, is switched-on. If, for example, the object is the finger or the hand of a person, a switching process can then be activated as a consequence—as already described—when the surface, which is now illuminated, is touched and when the finger is removed it is deactivated again. Additionally, between activation and deactivation a specific displacement can be detected as described above.

Figure 8:
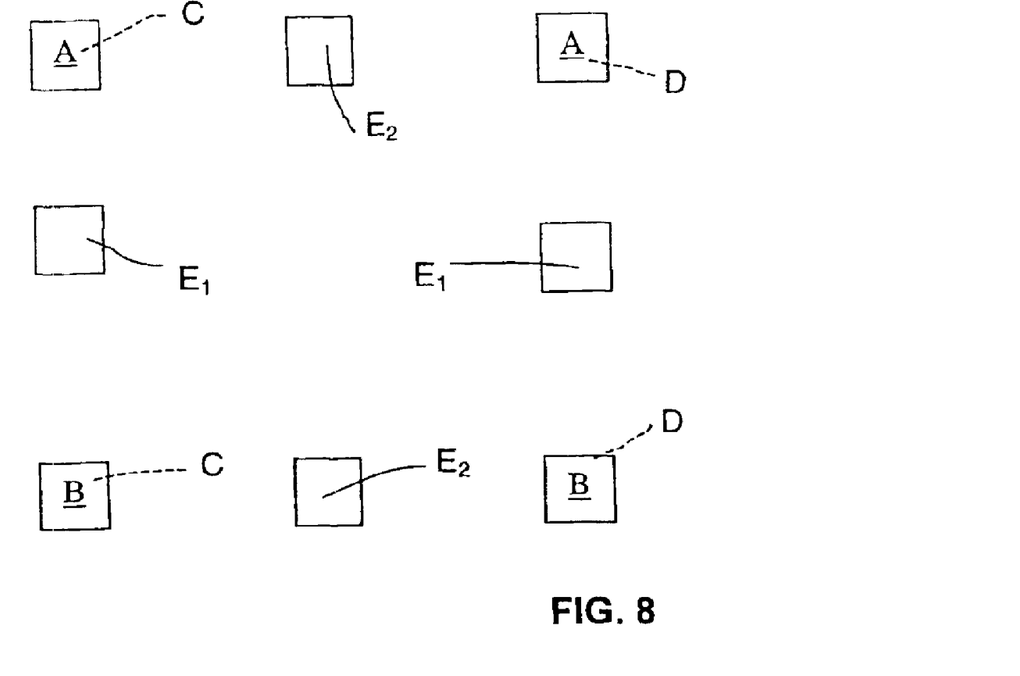
FIGS. 8, 9 are top views of various schematic measuring arrangements.

The aforementioned measuring arrangements can be disposed, for example, as in FIG. 8. In this way, for example, the radiation sources A/C A/D and B/C B/D together with the radiation receivers E1 or respectively E2, or E1 together with E2, can form a first measuring arrangement. A second measuring arrangement is formed from the radiation sources A/C/B/C and A/D/B/D together with the radiation receiver E2 or respectively E1, or E2 together with E1. The two measuring arrangements can operate in a sequential manner such that the four sources of radiation together with their radiation receivers form two interlocked measuring arrangements. This measuring arrangement is particularly suitable for vertical measuring through a glass plate, it being possible to select the following measuring arrangement for a measuring arrangement without an insulating glass plate: radiation sources A/C and B/C together with the radiation receiver E1, which is located between the sources of radiation, form one measuring arrangement, the second measuring arrangement is formed by the sources of radiation A/C and A/D together with the radiation receiver E2, which is located between the sources of radiation.

The main direction of radiation of the radiation emitters A/D, A/C and B/C is, in this case, in the direction of the common geometrical center point of the measuring arrangement, the radiation emitter B/D with the associated radiation receivers E1 and E2 can be omitted. With the last-named measuring arrangement, the position or respectively the displacement of, for example, a finger on an arbitrary surface can be detected as long as the finger is situated in the detection range of the measuring arrangements.

It is not necessary here for the first and second measuring arrangement to be disposed offset to each another by 90° as in FIG. 8. The important point exclusively is that they are disposed offset or respectively rotated to each other by a certain amount, with the exception of the position in which they are opposite each other exactly rotated through 180°.

Figure 9:
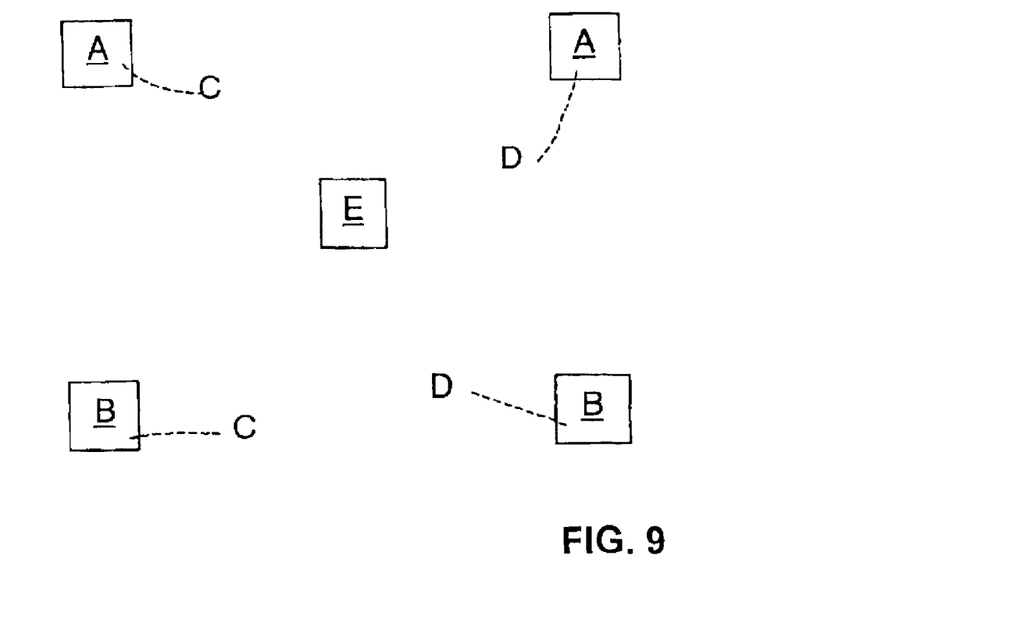
Figure 31:
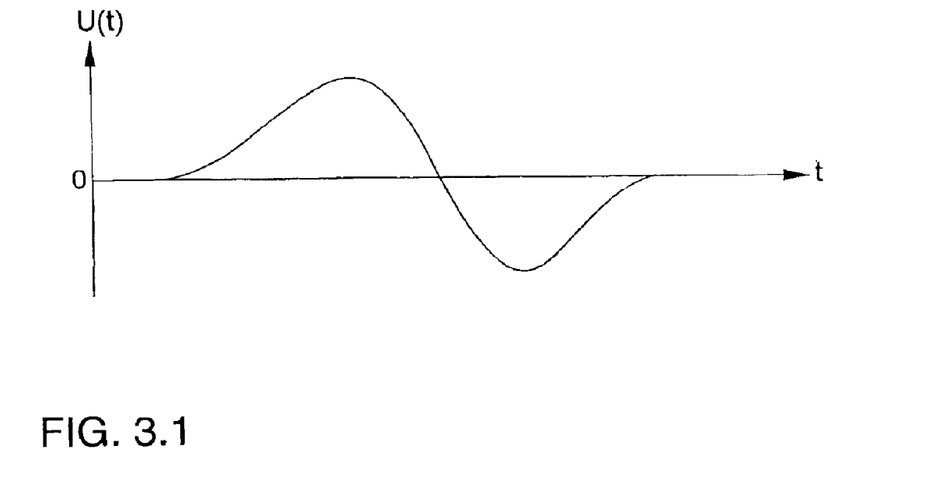
Figure 32:
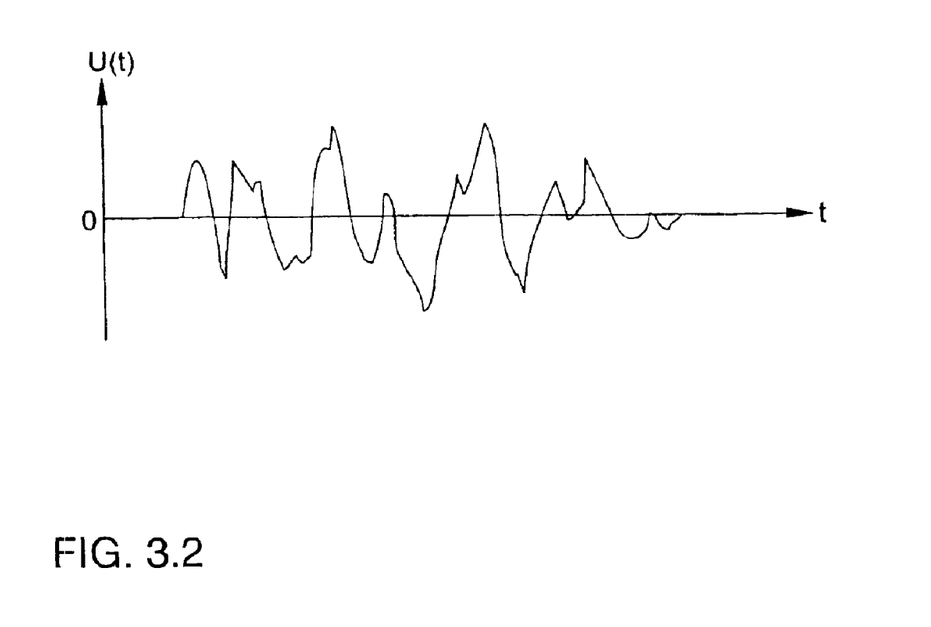

Another development of a measuring arrangement can be seen in FIG. 9: the radiation emitters A/C/A/D and B/C/B/D together with the radiation receiver E form a first measuring arrangement, the second measuring arrangement is formed by the radiation emitters A/C/B/C and A/D/B/D in conjunction with the radiation receiver E. The radiation receiver E, therefore, is used in a common manner for the two measuring arrangements and this poses no problem through a corresponding clocking of the sources of radiation and corresponding synchronous demodulation of the signal of the radiation receiver E.

It is obvious that this description can be subject to the most varied modifications, changes and adaptations, which range in the region of equivalents to the attached claims.

What is claimed is:

1. Method for opto-electronically determining the position of an object through at least one measuring arrangement, which is separated from the object by a medium, which is permeable to at least one specific radiation, the method comprising:

emitting the specific radiation through radiation sources;
detecting a reflection reflected by the object; and
determining an initial value, wherein an evaluation unit determines at least one of a position and a displacement of the object by the evaluation unit determining from the initial value a certain angular curve of the object relative to the radiation sources for a known spatial relationship between the radiation sources,
wherein by way of the angular curves through the evaluation unit and a circuit, which is configured as an evaluation unit, the following displacement pattern is detected:
bringing the object closer to at least one active sensor region;
detecting a touching of the object at a control surface in the active sensor region; and
detecting a removal of the object from the control surface.

2. Method according to claim 1, wherein the evaluation unit has a data bank, in which specific measured value relationships are assigned to specific angular correlations.

3. Method according to claim 1, further comprising detecting a displacement in the active sensor region.

4. Method according to claim 1, wherein when the object is brought closer, an illuminating device is activated as soon as a distance between the object and the measurement arrangement is fallen below a predetermined distance.

5. Method according to claim 4, wherein the control surface is not visible until the illumination device is activated.

6. Apparatus for opto-electronically determining a position of an object, the apparatus comprising:
a measuring arrangement, which is separated from the object by a medium, which is permeable to at least one specific radiation;
at least one active sensor region in the medium with at least two measuring paths, which are spatially determined with regard to a start point and an end point and are maintained by at least two radiation sources, which emit the specific radiation;
at least one radiation receiver, which is assigned to the radiation sources, the radiation receiver determining a reflection reflected by the object to create a detection signal that corresponds to the received radiation;
a device for determining an initial value, which is assigned to each measuring paths;
an evaluation unit that determines at least one of a position and a displacement of the object, the evaluation unit determines from the initial value a specific angular curve of the object relative to the radiation sources for a known spatial relationship between the radiation sources; and
a third radiation source or another measuring arrangement disposed at an arbitrary angle, relative to the plane, in which the first two radiation sources and the radiation receiver are disposed.

7. Apparatus according to claim 6, wherein the arbitrary angle is with the exception of an angle of 180°.

8. Method for opto-electronically determining the position of an object through at least one measuring arrangement, which is separated from the object by a medium, which is permeable to at least one specific radiation, the method comprising:
emitting the specific radiation through radiation sources;
detecting a reflection reflected by the object;
determining an initial value, which is assigned to individual measuring paths; and
conducting an evaluation of the initial value wherein an evaluation unit determines at least one of a position and a displacement of the object by the evaluation unit determining from the initial value a certain angular curve of the object relative to the radiation sources for a known spatial relationship between the radiation sources,
wherein a relationship of radiation output radiated by the radiation sources into measuring paths is used as the initial value, wherein the measuring paths extend from the measuring arrangement to the object and back to the measuring arrangement.

9. Method according to claim 8, further comprising determining the radiation output which has to be supplied to the radiation sources so as to set a differential value between the measuring paths to zero.

10. Method according to claim 8, wherein the evaluation unit has a data bank, in which specific measured value relationships are assigned to specific angular correlations.

11. Method according to claim 8, wherein by way of angular curves through the intermediary of the evaluation unit by way of a circuit, which is configured as an evaluation unit, a displacement pattern is detected:
bringing the object closer to at least one active sensor region;
detecting a touching of the object at a control surface in the active sensor region;
detecting a displacement in the active sensor region; and
detecting a removal of the object from the control surface.

12. Method according to claim 11, wherein when the object is brought closer, an illuminating device is activated as soon as a distance between the object and the measurement arrangement is fallen below a predetermined distance.

13. Method according to claim 12, wherein the control surface is not visible until the illumination device is activated.

14. Apparatus for opto-electronically determining a position of an object, the apparatus comprising:
a measuring arrangement, which is separated from the object by a medium, which is permeable to at least one specific radiation;
at least one active sensor region in the medium with at least two measuring paths, which are spatially determined with regard to a start point and an end point and are maintained by at least two radiation sources, which emit the specific radiation;
at least one radiation receiver, which is assigned to the radiation sources, the radiation receiver determining a reflection reflected by the object to create a detection signal that corresponds to the received radiation;
a device for determining an initial value, which is assigned to each measuring path; and
an evaluation unit that determines at least one of a position and a displacement of the object, the evaluation unit determines from the initial value a specific angular curve of the object relative to the radiation sources for a known spatial relationship between the radiation sources,
wherein a relationship of the radiation output radiated into the measuring paths is used as the initial value.

15. Apparatus accordingly to claim 14, wherein a radiation output which has to be supplied to the radiation sources is determined so as to set a differential value between the measuring paths to zero.

16. Apparatus according to claim 14, further comprising a pulse generator for the alternate operative switching of the individual radiation measuring paths as well as a synchronous demodulator, which is controlled by the pulse generator, for the assignment of the detection signal as measured value to each measuring path to form the initial value.

17. Apparatus according to claim 14, further comprising a third radiation source or another measuring arrangement disposed at an arbitrary angle, relative to the plane, in which the first two radiation sources and the radiation receiver are disposed.

* * * * *